US012236699B1

(12) United States Patent
Huang et al.

(10) Patent No.: US 12,236,699 B1
(45) Date of Patent: Feb. 25, 2025

(54) MULTIMODAL DATA HETEROGENEOUS TRANSFORMER-BASED ASSET RECOGNITION METHOD, SYSTEM, AND DEVICE

(71) Applicant: JINAN UNIVERSITY, Guangzhou (CN)

(72) Inventors: Feiran Huang, Guangzhou (CN); Zhenghang Yang, Guangzhou (CN); Zhibo Zhou, Guangzhou (CN); Shuyuan Lin, Guangzhou (CN); Jian Weng, Guangzhou (CN)

(73) Assignee: JINAN UNIVERSITY, Guangzhou (CN)

( * ) Notice: Subject to any disclaimer, the term of this patent is extended or adjusted under 35 U.S.C. 154(b) by 0 days.

(21) Appl. No.: 18/956,232

(22) Filed: Nov. 22, 2024

(30) Foreign Application Priority Data

Mar. 7, 2024 (CN) .......................... 202410257623.0

(51) Int. Cl.
*G06V 30/24* (2022.01)
*G06V 20/62* (2022.01)
*G06V 30/16* (2022.01)
*G06V 30/19* (2022.01)

(52) U.S. Cl.
CPC .......... *G06V 30/2552* (2022.01); *G06V 20/62* (2022.01); *G06V 30/16* (2022.01); *G06V 30/19127* (2022.01); *G06V 30/19147* (2022.01); *G06V 30/19173* (2022.01)

(58) Field of Classification Search
CPC .................................................. G06V 20/62
See application file for complete search history.

(56) References Cited

U.S. PATENT DOCUMENTS

2022/0147838 A1* 5/2022 Gu .......................... G06V 20/00
2022/0300764 A1* 9/2022 Liu ..................... G06F 18/2148
2022/0382565 A1* 12/2022 Sunkara ................. G06N 3/084
(Continued)

FOREIGN PATENT DOCUMENTS

| CN | 114283430 A | 4/2022 |
| CN | 115223175 A | 10/2022 |
| CN | 116910633 B | 10/2023 |

*Primary Examiner* — Edward Park
(74) *Attorney, Agent, or Firm* — JEEN IP LAW, LLC (57) ABSTRACT

This invention discloses a multimodal data heterogeneous Transformer-based asset recognition method, system, and device, the method including: collecting various-modal information of an asset, including text information and image information; building an ALBERT model, a ViT model, and a CLIP model; by the ALBERT model, extracting a text information feature; by the ViT model, extracting an image information feature; by the CLIP model, extracting image-text matching information feature; by different channels, applying asset type recognition to information in different modalities; outputting classification information from the different channels; by the CLIP model, generating asset void information; and discriminatively fusing the classification information from the different channels with the matching degree between the image information and the text information obtained by the CLIP model, and outputting final asset class information. This invention realizes comprehensive discrimination by drawing from multiple modalities to improve the accuracy of asset recognition.

8 Claims, 5 Drawing Sheets

(56) References Cited

U.S. PATENT DOCUMENTS

2023/0185839 A1 6/2023 Frei
2023/0281963 A1 9/2023 Gopalkrishna
2023/0360640 A1 11/2023 Asi

* cited by examiner

MULTIMODAL DATA HETEROGENEOUS TRANSFORMER-BASED ASSET RECOGNITION METHOD, SYSTEM, AND DEVICE

CROSS-REFERENCE TO RELATED APPLICATIONS

This application claims priority to Chinese Patent Application No. 202410257623.0, filed on Mar. 7, 2024, which is hereby incorporated by reference in its entirety.

TECHNICAL FIELD

This invention relates to the technical field of asset classification and, in particular, to a multimodal data heterogeneous Transformer-based asset recognition method, system, and device.

BACKGROUND

Asset recognition technology is about the process of recognizing and classifying assets in a digital environment. This technology involves in-depth analysis of images, videos, audio, and other types of multimedia contents to extract key information about the assets. To that end, the asset recognition technology employs various sophisticated algorithms, machine learning models, and computer vision technologies. These technologies help extract and identify information in the assets, and then classify and label the same based on specific attributes such as object type, location, color, etc. The objective of asset recognition is to simplify the process of managing and organizing digital assets, making it easier for the users to search for and access specific assets they need. Asset recognition technology mainly includes identifier-based, image recognition-based, and device feature-based algorithms. The identifier-based algorithms are suitable for scenarios where assets with unique identifiers need to be identified. The image recognition-based algorithms are suitable for recognizing assets based on features of the assets, such as shapes, color or the like. The device feature-based algorithms are suitable for identifying network devices, IoT (Internet of Things) devices or the like.

The identifier-based asset recognition technology recognizes assets by reading specific identifiers. The identifiers may be a digital code, a QR code, a barcode, a RFID (Radio Frequency recognition) tag, or identifiers in other forms. This process mainly involves manually labeling the assets with barcodes and RFID electronic tags, scanning the identifiers, and registering the asset data into a backend system. The disadvantages of QR codes and barcodes include the need for manual labeling, which could be labor-intensive. Although the RFID helps automatically identifying target objects and retrieving related data via RF (radio frequency) signals, it is costly and requires specialized scanning devices. By reading identifiers, the algorithm can determine the location and status of the assets. Identifier-based asset recognition technology requires a reading device, such as a scanner or a reader, and a database to store the identifier information. The disadvantages include the possibility of identifiers becoming defunct or damaged, which can lead to recognition failure. Moreover, excessive quantity of identifiers can be challenging to read and maintain. The devices and identifiers directly rely on network connections, and cannot guarantee real-time asset recognition information.

The image recognition-based asset recognition technology recognizes and tracks assets using image recognition technology. It typically involves cameras or other image capturing devices for scanning and collecting image data of the assets. Then, using image recognition technologies such as computer vision and machine learning algorithm, the assets may be identified and tracked without the need for any identifiers on the assets. By analyzing images, items of various shapes and dimensions can be identified. However, some technical limitations remain. For instance, the recognition accuracy can fluctuate significantly under variations in lighting conditions and viewing angles. The system operates on high computational power, as well as huge storage resource for maintaining the massive amount of image data. Most importantly, the recognition performance relies heavily on the image quality, so high-quality image systems are required for effective operation.

The device feature-based asset recognition algorithms use specific features of devices to recognize assets. By extracting and comparing features of network devices, the devices may be classified and identified. These features may include the devices' unique identifiers (e.g., MAC address), serials, version numbers, etc. The algorithm analyzes and compares these features to identify an associated device, and to determine whether the device falls under a specific asset class. However, this technology cannot recognize assets without device features. A stringent management system is also required to guarantee consistency and accuracy throughout the device features and the assets. Besides, the asset recognition may be misled by the device features, relies on extensive feature libraries, and is vulnerable to factors in the network environment.

Therefore, there is an urgent need for an asset recognition technology that can achieve higher accuracy and feasibility.

SUMMARY

In order to overcome the deficiencies and shortcomings in the existing art, this invention provides a multimodal data heterogeneous Transformer-based asset recognition method. This invention incorporates an ALBERT model, a ViT model and a CLIP model into one entity, and introduces a new discriminative loss for class discrimination learning, hence allowing the new model to combine the discriminative capabilities of the individual models, and realizing comprehensive discriminative capability by drawing from multiple modalities, thereby improving the accuracy of asset recognition.

A second objective of this invention lies in providing a multimodal data heterogeneous Transformer-based asset recognition system.

A third objective of this invention lies in providing a computing device.

To achieve the aforementioned objectives, this invention adopts the following technical solutions.

A multimodal data heterogeneous Transformer-based asset recognition method, including:
  collecting various-modal information of an asset, including text information and image information;
  building an ALBERT model, a ViT model, and a CLIP model;
  by the ALBERT model, extracting a text information feature: using a multilayer Transformer encoder to learn a context relation in a text sequence; connecting an output of the ALBERT model to a fully connected layer; and outputting final classification information;

by the ViT model, extracting an image information feature: dividing the image information into tokens; using a Transformer encoder to capture and learn content information from the dividing of the image information; and using a classification head to map an image feature to class information;

by the CLIP model, extracting image-text matching information feature: building an image with matching text description sample pair; encoding the image information and the text information to obtain an image feature representation vector and a text feature representation vector; linearly projecting the image feature representation vector and the text feature representation vector into a multimodal space; calculating a similarity between two modalities to obtain a matching degree between the image information and the text information;

by different channels, applying asset type recognition to information in different modalities; outputting classification information from the different channels; by the CLIP model, generating asset void information; and discriminatively fusing the classification information from the different channels with the matching degree between the image information and the text information obtained by the CLIP model, and outputting final asset class information.

As a preferred scheme, the by the ALBERT model, extracting a text information feature: using a multilayer Transformer encoder to learn a context relation in a text sequence; connecting an output of the ALBERT model to a fully connected layer; and outputting final classification information includes:

preprocessing the text information; converting the preprocessed text information into a vector representation; adding an identifier to indicate a start or an end; performing padding and truncating; randomly replacing part of the texts with [MASK] tokens; and by a MLM model, performing inferential prediction;

generating a token embedding vector $E_{token}$, a segment embedding vector $E_{seg}$, and a position embedding vector $E_{seg}$; and representing a generated embedding by:

$$E=E_{token}\|E_{seg}\|E_{pos}$$

where the $\|$ denotes concatenation;

randomly initializing a token embedding matrix and selecting a corpus for training, where the training includes updating values in the embedding matrix to fit the corpus; setting a memorized token embedding vector upon termination of the training to be a final embedding vector; learning a paragraph containing a word based on the segment embedding vector; and learning a relative position of a word based on the position embedding vector;

feeding the generated embedding into a multilayer perceptron to obtain a vector $E_{obj}$; feeding the vector $E_{obj}$ into the Transformer encoder to generate a presence vector $E_{present}$, denoted as:

$$E_{present}=\text{Transformer}_{encoder}(E_{obj})$$

where the $\text{Transformer}_{encoder}$ a denotes the Transformer encoder;

passing the presence vector $E_{present}$ through the fully connected layer $MLP_{class}$ and a softmax function for classification to obtain an recognition type as:

$$\text{type}=\text{softmax}(MLP_{class}(E_{present})).$$

As a preferred scheme, the by the ViT model, extracting an image information feature: dividing the image information into tokens; using a Transformer encoder to capture and learn content information from the dividing of the image information; and using a classification head to map an image feature to class information includes:

dividing an image into multiple image patches, and mapping the image into a D-dimensional vector $E_D$ through the fully connected layer, denoted as:

$$E_D=MLP(\text{image patch})$$

adding the $E_D$ and a class token to the vector position token to form an input $\text{Input}_{trans}$ for the Transformer encoder, denoted as:

$$\text{Input}_{trans}=E_D+\text{position token}+\text{class token}$$

passing an embedding corresponding to a class token output from the Transformer encoder through the multilayer perceptron and a softmax function to output a probability of a class; and setting the class with the highest probability to be a final determined class output $\text{Output}_{class}$ by the ViT model, denoted as:

$$\text{Output}_{class}=\text{MAX}(\text{softmax}(MLP(\text{Transformer}(\text{Input}_{trans}))))$$

where the MLP denotes the multilayer perceptron.

As a preferred scheme, the encoding the image information and the text information to obtain an image feature representation vector and a text feature representation vector; linearly projecting the image feature representation vector and the text feature representation vector into a multimodal space; calculating a similarity between two modalities to obtain a matching degree between the image information and the text information includes:

encoding the image information and selecting a class token to be a feature representation vector $E_{image}$ of the image information;

encoding the text information and selecting a vector associated with text position information to be a feature representation vector $E_{text}$ of the text;

projecting the embedding of multimodalities into the multimodal space, where projected vectors are denoted as:

$$T=W_t(E_{text})$$

$$I=W_i(E_{image})$$

where the $W_t$ denotes text corresponding parameters, the $W_i$ denotes image corresponding parameters, T represents a text vector projected in the multimodal space, and I represents an image vector projected in the multimodal space;

calculating a cosine similarity between the text vectors and the image vectors, and passing the vectors by rows and by columns through the softmax function to learn using a cross-entropy loss function.

As a preferred scheme, the by different channels, applying asset type recognition to information in different modalities; outputting classification information from the different channels includes:

for a sample having only text information: after text preprocessing, feeding into an ALBERT channel to perform asset class recognition, and outputting an asset class;

for a sample having only image information: after image preprocessing, feeding into a ViT channel to perform asset class recognition, and outputting an asset class;

for an asset having corresponding image information and text information: feeding into three channels, and outputting: a text embedding vector representation from the ALBERT channel, an image embedding vector representation from the ViT channel, and a text-image matching similarity from the CLIP channel.

As a preferred scheme, the by the CLIP model, generating asset void information includes:

obtaining data having a text-image pair; selecting text data or image data from the text-image pair; setting corresponding real image information or real text information to be label information, where a loss function $\text{Loss}_{gen}$ for a generation module of the CLIP model is denoted as:

$$\text{Loss}_{gen} = |\text{label}_{real} - \text{label}_{output}|$$

where the $\text{label}_{real}$ denotes the label information, and the $\text{label}_{output}$ denotes output information;

after completion of the training, feeding the text information or the image information into the CLIP model to obtain corresponding complementary information.

As a preferred scheme, the discriminatively fusing the classification information from the different channels with the matching degree between the image information and the text information obtained by the CLIP model includes:

jointly identifying the classification information from the different channels with the matching degree obtained from the CLIP model; when class outputs from the different channels are consistent and the matching degree from the CLIP model is above a threshold, outputting the class information; when the class outputs from the different channels are inconsistent or the matching degree is not above the threshold, discriminatively fusing the classes based on the matching degree, and outputting the final asset class information.

As a preferred scheme, the discriminatively fusing the classification information from the different channels with the matching degree between the image information and the text information obtained by the CLIP model includes:

for an asset having both an image and a text, performing a discriminative fusion training, including:

obtaining final feature embedding vectors from the text channel and the image channel, respectively, where distances between the feature embedding vectors of the matching text and image as in respective modal spaces are denoted as:

$$\text{Dis}_z = (E_{present}^i - E_{image}^i)$$

$$\text{Dis}_n = (E_{present}^i - E_{image}^j) i \neq j$$

where the $E_{present}^i$ denotes a text feature embedding vector, the $E_{image}^i$ denotes an image feature embedding vector, the $\text{Dis}_s$ denotes a distance between the feature embedding vectors of image and text having matching information, and the $\text{Dis}_n$ denotes a distance between the feature embedding vectors of non-matching image and text;

where, in different modalities, distances between embedding vectors representing different information is denoted as:

$$\text{Dis}(e_{p1}, e_{p2}) = \text{Dis}(e_{i1}, e_{i2})$$

$$\text{Dis}(e_{p1}, e_{p2}) = e_{p1} - e_{p2}$$

$$\text{Dis}(e_{i1}, e_{i2}) = e_{i1} - e_{i2}$$

using the matching degree output from the CLIP model as an accumulation term to build a loss for the discriminative fusion training, denoted as:

$$\text{Loss}_{critic} = \min \alpha(-\Sigma \log \sigma(\text{Dis}_s - \text{Dis}_n)) + \beta(\text{Dis}(e_{i1}, e_{ij}) + \text{Dis}(e_{p1}, e_{p2})) + \gamma \text{Sim}$$

where the $\alpha, \alpha, \gamma$ are automatically learned and generated for different datasets, the $\sigma$ is a sigmoid activation function, and the Sim denotes the matching degree;

after the training, obtaining the discriminatively fused embedding vector representation $E_{final}$, and passing the same through a softmax classifier for classification to obtain the final asset class information, denoted as:

$$\text{Class}_{final} = \text{softmax}(\text{critic}(E_{present}, E_{image}, \text{Sim}))$$

where the $E_{present}$ denotes the text channel feature embedding vector, the $E_{image}$ denotes the image channel feature embedding vector, and the $\text{Class}_{final}$ denotes the final asset class information.

To achieve the second objective, this invention has adopted the following technical solution.

This invention provides a multimodal data heterogeneous Transformer-based asset recognition system, including: an information collection module, a model building module, a text data encoder, an image data encoder, a text data classifier, an image data classifier, a matching information extraction module, a multimodal space projector, a similarity calculation module, a content generation module, a discriminative fusion module, and an asset class information outputting module, where:

the information collection module collects various-modal information of an asset, including text information and image information;

the model building module builds an A Lite Bidirectional Encoder Representations from Transformers, ALBERT, model, a Vision Transformer, ViT, model, and a Contrastive Language-Image Pre-Training, CLIP, model;

the text data encoder uses the ALBERT model to extract a text information feature, and uses a multilayer Transformer encoder to learn a context relation in a text sequence;

the text data classifier connects an output of the ALBERT model to a fully connected layer, and outputs final classification information;

the image data encoder uses the ViT model to extract an image information feature: divide the image information into tokens; use a Transformer encoder to capture and learn content information from the dividing of the image information;

the image data classifier uses a classification head to map an image feature to class information;

the matching information extraction module uses the CLIP model to extract image-text matching information feature: build an image with matching text description sample pair; encode the image information and the text information to obtain an image feature representation vector and a text feature representation vector;

the multimodal space projector linearly project the image feature representation vector and the text feature representation vector into a multimodal space;

the similarity calculation module calculates a similarity between two modalities to obtain a matching degree between the image information and the text information;

the content generation module uses the CLIP model to generate asset void information;

the discriminative fusion module uses different channels to apply asset type recognition to information in different modalities, output classification information from the different channels, and discriminatively fuse the classification information from the different channels with the matching degree between the image information and the text information obtained by the CLIP model; and the asset class information outputting module outputs the final asset class information.

To achieve the third objective, this invention adopts the following technical solutions.

A computing device, including a processor, and a memory for storing a program executable by the processor, where the processor implements, upon execution of the program stored in the memory, the multimodal data heterogeneous Transformer-based asset recognition as mentioned above.

Compared with the existing art, this invention has the following advantages and desirable effects:

this invention incorporates an ALBERT model, a ViT model and a CLIP model into one entity, and introduces a new discriminative loss for class discrimination learning, hence allowing the new model to combine the discriminative capabilities of the individual models, and realizing comprehensive discrimination by drawing from multiple modalities, thereby improving the accuracy of asset recognition.

DESCRIPTION OF EMBODIMENTS

To make the objectives, technical solutions, and advantages of this invention clearer, this invention will be explained in more detail in the following in conjunction with the accompanying drawings and embodiments. It should be understood that the specific embodiments described herein merely serve to explain, rather than limit, this invention.

Embodiment 1

Figure 1:
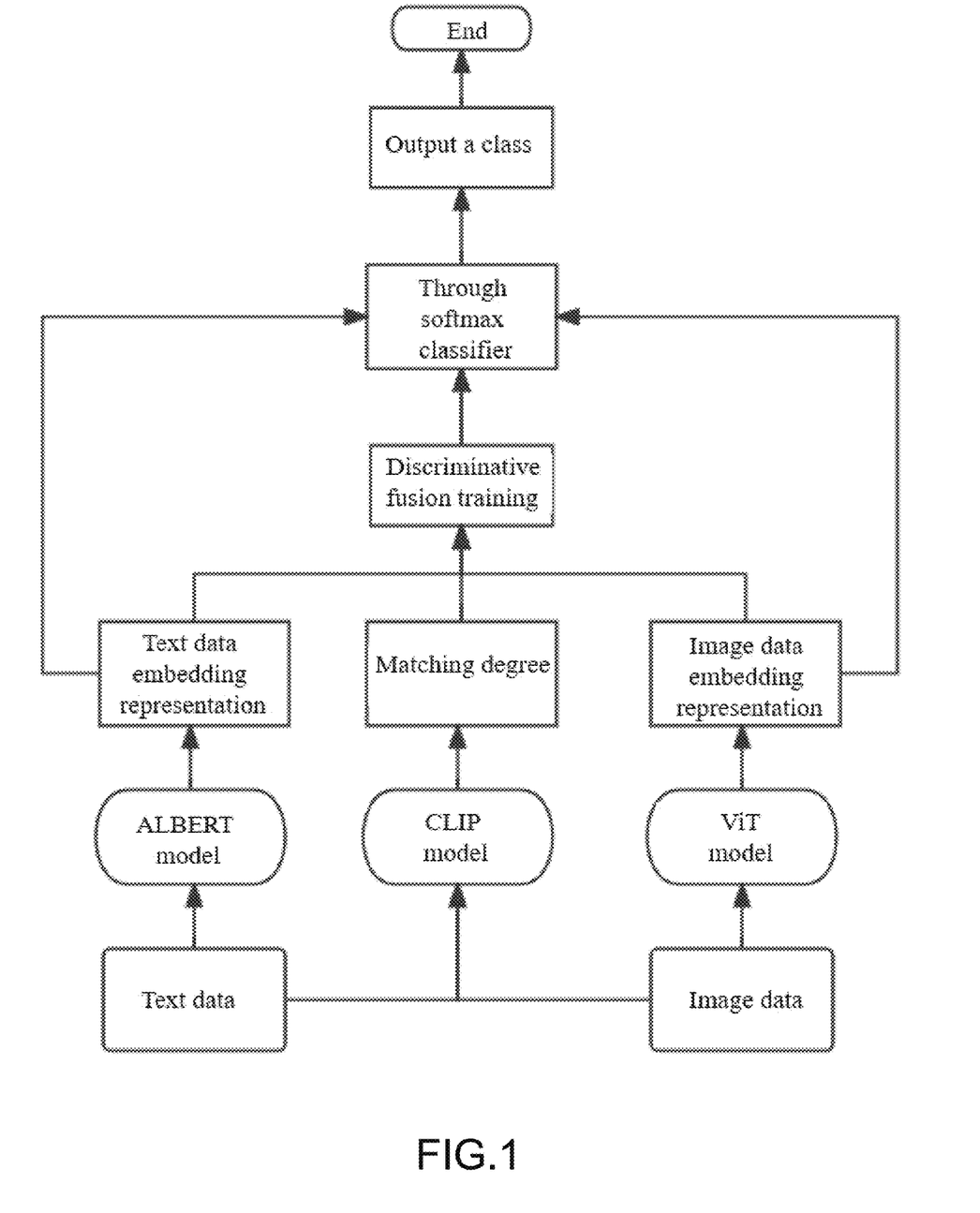
FIG. 1 is a flowchart illustrating the multimodal data heterogeneous Transformer-based asset recognition method of this invention.

As shown in FIG. 1, this embodiment provides a multimodal data heterogeneous Transformer-based asset recognition method, including these steps:

S1: Collect information of an asset in various-modalities, including text information and image information, the text information including an asset name, an asset descriptions, etc., the image information including a photograph, a video clip, etc., containing the asset. More specifically, this step may include:

S11: Collect text information: by a text collection means, obtain asset-related textual description information, and perform data preprocessing on the textual description information.

In this embodiment, it is specified which asset-related textual description information is obtained, which may involve specific asset classes, keywords, etc. The collected text is cleaned and preprocessed to remove HTML tags, special characters, punctuation marks, etc. The text cleaning and preprocessing may be performed using regular expressions, or Python libraries such as NLTK or spaCy. When needed, keyword extraction means can be used to extract asset-related keywords from the cleaned text, allowing for screening and pinpointing information related to the assets.

S12: Collect image information: by an image collection means, obtain asset-related visual image information, and perform data preprocessing on the image information.

In this embodiment, it is specified which asset-related image information is obtained, which may include different classes of assets, images captured from various angles, etc. The collected images are accurately annotated to associate individual images with related asset information. The annotation may include information such as class, location, status, etc. Meanwhile, the data is cleaned to remove poor-quality or erroneous images. The image data may undergo data augmentation means, such as rotating, flipping, scaling, etc., to improve the robustness of the model. Finally, the collected images may be unified to normalized dimensions and pixel values, so as to prepare them to suit for being fed into subsequent models.

S2: Build an ALBERT model for extracting feature from text information, a ViT model for extracting feature from image information, and a CLIP model for feature matching the image and text information. More specifically, this step may include:

S21: For the text information, extract a text information feature by the ALBERT model.

Initially, the text is cleaned and preprocessed, including the removal of special characters, punctuation marks, stopwords, etc. The preprocessed text is then converted into a numeric representation. Word embedding means (such as Word2Vec, GloVe) may be used to map each word to a fixed-length vector. Or, a bag-of-words model may be used to convert the text into a sparse vector representation. Special tokens indicating the start or end of a sequence may be added to the input data before the text vectors are fed into the ALBERT model. The ALBERT model may work through a multilayer Transformer encoder to learn the context relations in the text sequence. The output of the ALBERT model is connected to a fully connected layer to output the final classification information.

Figure 2:
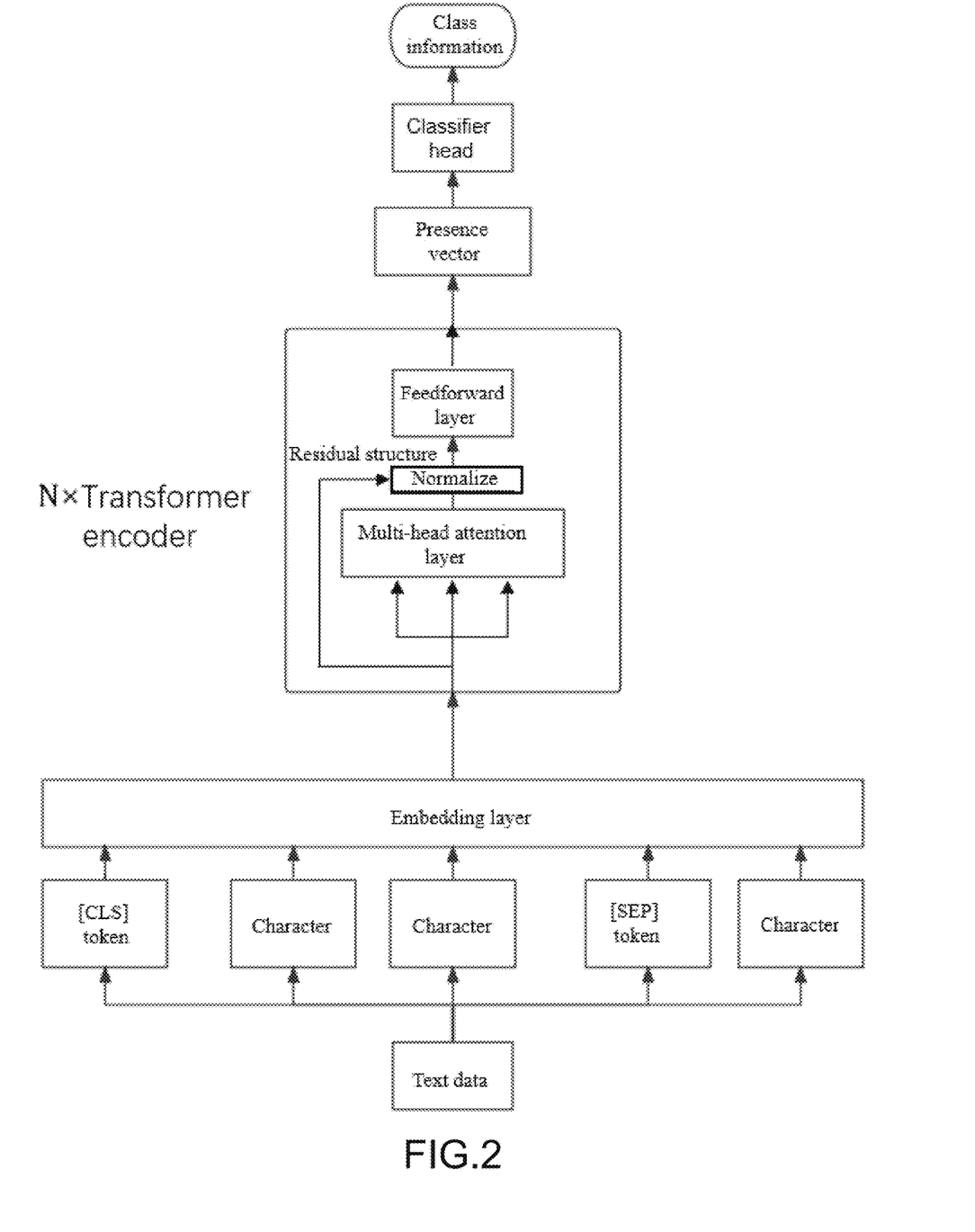
FIG. 2 is a flowchart illustrating the process of the ALBERT model in this invention extracting a feature from text information.

FIG. 2 depicts an overview of a readily built ALBERT model for extracting feature from text information. Initially, the text information is preprocessed and transformed into tokens according to a vocabulary needed by the model. Then, special tokens, such as [CLS] and [SEP], are appended to the start or end of the sequence. After that, padding and truncating are applied, and some tokens are randomly selected to be special [MASK] tokens for prediction tasks by Masked Language Modeling (MLM).

In this embodiment, the training of the MLM includes randomly replacing some words in the input sequence by the [MASK] tokens, and the model would aim to predict these masked words. Specifically, this may include:

Model Loading: load a pre-trained MLM model that contains pre-trained weights for the [MASK] tokens;

Input Preparation: for a specific task, convert the input text into an input format for the model, where some words in the text are randomly selected and replaced with [MASK] tokens;

Inference: feed the processed text with the [MASK] tokens into the loaded MLM model for drawing inferences. The model will yield a probability distribution corresponding to the [MASK] tokens, representing the model's predictions for possible words;

Prediction: decode the output probability distribution, and select the word having the highest probability as the predicted outcome.

Evaluation: compare the model's predictions with the real targets, and evaluate a performance metric (such as accuracy) to assess the model's performance on the specific task.

In this embodiment, a specific MLM task requires the model to predict the values marked as [MASK] in the text sequence. For example, an original text sequence may be "Predict the outcome for this sequence", and the MLM task would be randomly convert words in the sequence to [MASK] tokens, such as "Predict the outcome for this [MASK]", and the ultimate task for the model is to predict that the [MASK] is most likely "sequence". Finally, a token embedding vector $E_{token}$ is generated. Additionally, segment embedding vectors $E_{seg}$ for building sentence pair tasks, as well as position embedding vectors $E_{pos}$ related to word position information, are also created. Eventually, the three types of embeddings as explained above are used to generate a final embedding. Specifically, this may be denoted as:

$$E=E_{token}\|E_{seg}\|E_{pos}$$

where $\|$ denotes concatenation. For example, when a first embedding is [0, 1, 1] and a second embedding is [1, 1, 0], then the concatenated result would be [0, 1, 1, 1, 1, 0].

In this embodiment, the token embedding vector is learned by the model through tasks such as the MLM as described above. Initially, a token embedding matrix is randomly initialized, and then a corpus is selected for training. During the training, the values in the embedding matrix are iteratively updated to fit the corpus. At the end of the training, the memorized token embedding vector will be taken as the final embedding vector. Procedures similar to that of the token embedding vector will be applied to the segment embedding vector and position embedding vector. The segment embedding vector primarily learns the segment in which a word is located, while the position embedding vector primarily learns the relative positions of individual words. The specific procedures all begin from initializing to random values and iteratively making updates during the training.

Afterwards, the generated embedding is mapped to a first layer having a small dimension, a 16-dimension space, and are then, through a second layer, a fully connected layer, mapped to a target dimension, a H=128-dimensional space. The resultant embedding is denoted by $E_{obj}$. This trims the number of parameters in the embedding matrix, thereby downsizing the model. These may be denoted as:

$$E_{obj}=MLP(E)$$

where the MLP denotes a multilayer perceptron, a neural network represented by multiple hidden layers. In this particular embodiment, it stands for the overall neural network including the first layer having the small 16-dimensional space, i.e., the space to which the generated embedding is mapped to, and the second layer, i.e., the fully connected 128-dimensional space.

The generated $E_{obj}$ is fed into an encoder including multiple Transformer blocks. The embedding is passed through all layers, allowing the content therein to be captured by the neural network.

In this embodiment, the embedding is already a comprehensive representation of the aforementioned three embeddings (i.e., the token embedding, the segment embedding and the position embedding), where these embedding vectors themselves also include some context information about a text sequence. This embedding is then fed into the Transformer encoder having components such as a self-attention mechanism and a feedforward neural network. The self-attention mechanism allows the model to handle a word without losing sight of information about other words, hence enabling individual transformer blocks to capture context information and obtain attention weights. After that, the feedforward neural network applies linear transformation and activation function to the representations of the individual positions, furthering the model's representational capability.

Moreover, the multi-head attention mechanism in the Transformer allows the model to learn different context relations in different attention heads, enabling it to capture contexts in various aspects.

Finally, multiple Transformer layers are stacked together, with each layer being capable of capturing context relations. By stacking multiple layers, complex context relations can be handled, and enhanced understanding of the context relationships can be gained.

In this embodiment, all Transformer blocks facilitates a multi-head attention layer, a normalization layer, a residual structure, and a feedforward layer, where the multi-head attention layer primarily captures sequential relations among various positions in a text sequence by computing in parallel the attention weights of multiple attention heads, the normalization layer aims to ensure that the outputs of individual sub-layers are in similar scales by subtracting their mean and dividing by the standard deviation, which helps stabilizing the training process. The residual structure adds a residual connection to outputs of individual sub-layers by adding the input to the output, which helps prevent vanishing gradient problems and effectively passes information directly through the residual structure, avoiding the loss of meaningful information during computation. The feedforward layer learns linear and nonlinear features in the text information through linear and nonlinear transformations, ultimately generating a 768-dimensional vector, a vector representing the semantic information of the entire text, a.k.a., the [CLS] token. In the input sequences, the [CLS] token is typically placed at the beginning of a sentence. During pre-training of the model, the [CLS] token is used to encode an entire sentence, generating a vector representation associated with the entire sentence. This vector is called a presence vector, denoted by $E_{present}$:

$$E_{present}=\text{Transformer}_{encoder}(E_{obj})$$

The generated $E_{present}$ is then brought to a fully connected layer $MLP_{class}$, followed by a softmax function for classification. The classification head includes a linear layer fully connected network and a probability output function softmax, with the output being the identified type:

$$\text{type}=\text{softmax}(MLP_{class}(E_{present}))$$

Figure 3:
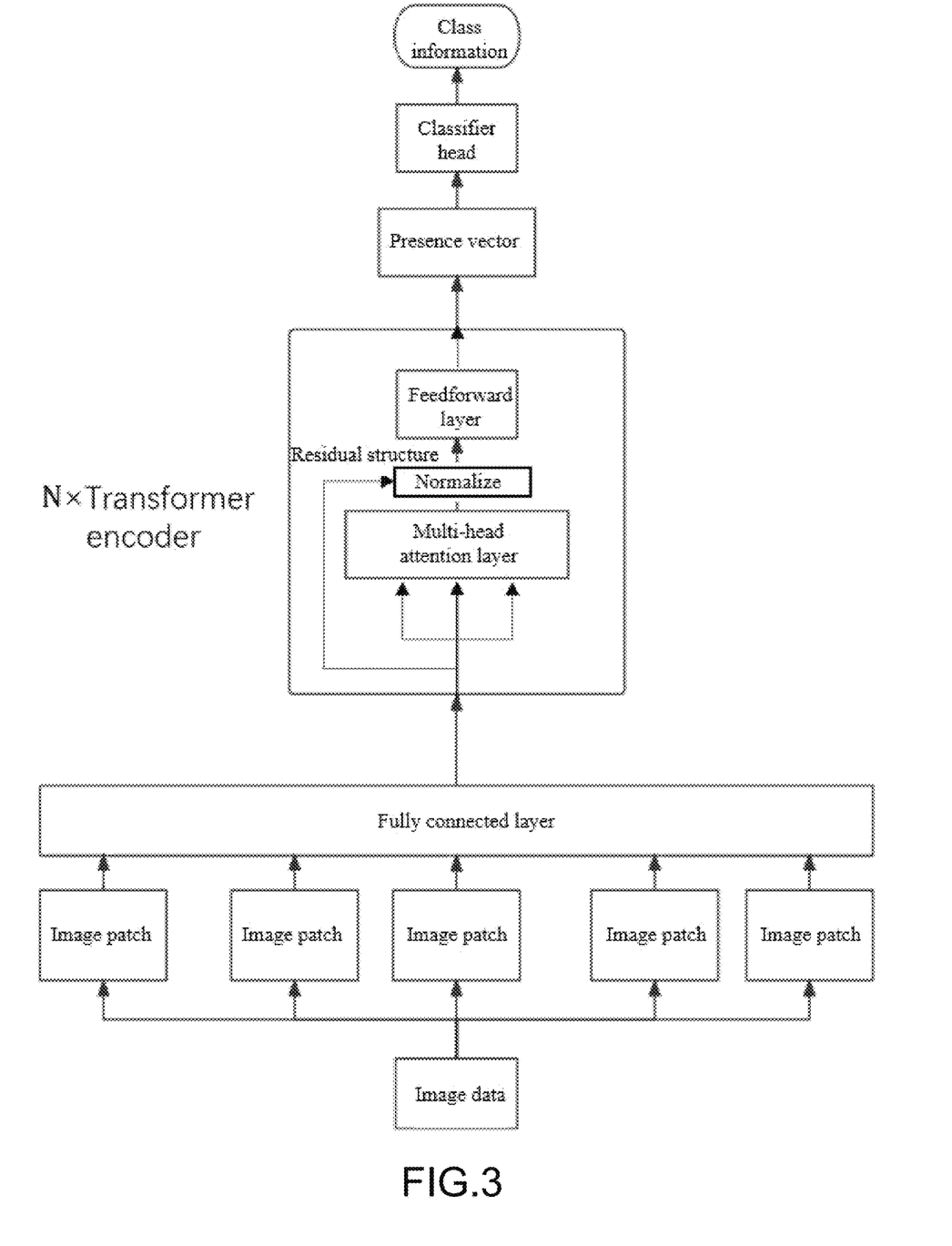
FIG. 3 is a flowchart illustrating the process of the ViT model in this invention extracting a feature from image information.

S22: For image information, extract feature using the ViT model.

ViT (Vision Transformer) is a neural network model that applies the Transformer architecture to computer vision tasks. An image is initially divided into tokens. Then, a Transformer encoder captures and learns the content information of the divided image. Finally, the image features are mapped into specific class information by a classification head.

FIG. 3 depicts an overview of a ViT model for extracting feature from image information. The Transformer module used has the same network structure as that of the Transformer module in FIG. 2, albeit with a different task assignment: the FIG. 2 one is assigned NLP tasks, i.e., text classification and recognition, and the present one is assigned image recognition tasks. Moreover, the Transformers differ by their downstream tasks, too.

Initially, a preprocessed image is divided into N(16×16) image patches that are flattened and then put through a fully connected layer in orders from left to right and top to bottom. The fully connected layer maps the image into a D-dimensional vector $E_D$, denoted as:

$$E_D = MLP(\text{image patch})$$

To the $E_D$, a class token (i.e., a learnable tensor of dimension D) and a position token (i.e., a learnable tensor of dimension D) are added. The sum of these three is formed into the input $Input_{trans}$ for the Transformer encoder, denoted as:

$$Input_{trans} = E_D + \text{position token} + \text{class token}$$

In all Transformer blocks, the procedure passes through a multi-head attention layer, a normalization layer, a residual structure, and a feedforward layer. The multi-head attention layer primarily captures sequential relations among various positions in a text sequence by computing in parallel the attention weights of multiple attention heads. The normalization layer aims to ensure that the outputs of the individual sub-layers are in similar scales by subtracting their mean and dividing by the standard deviation. These help stabilizing the training process. The residual structure adds a residual connection to outputs of individual sub-layers by adding the input to the output, which helps prevent vanishing gradient problems and effectively passes information directly through the residual structure, avoiding the loss of meaningful information during computation. The feedforward layer learns linear and nonlinear features in the text information through linear and nonlinear transformations. An embedding corresponding to a class token output from the Transformer encoder is passed through the multilayer perceptron and a softmax function to yield a probability of a class. The class with the highest probability is taken as a final determined class $output_{class}$ by the ViT model, denoted as:

$$Output_{class} = MAX(softmax(MLP(\text{Transformer}(Input_{trans}))))$$

Figure 4:
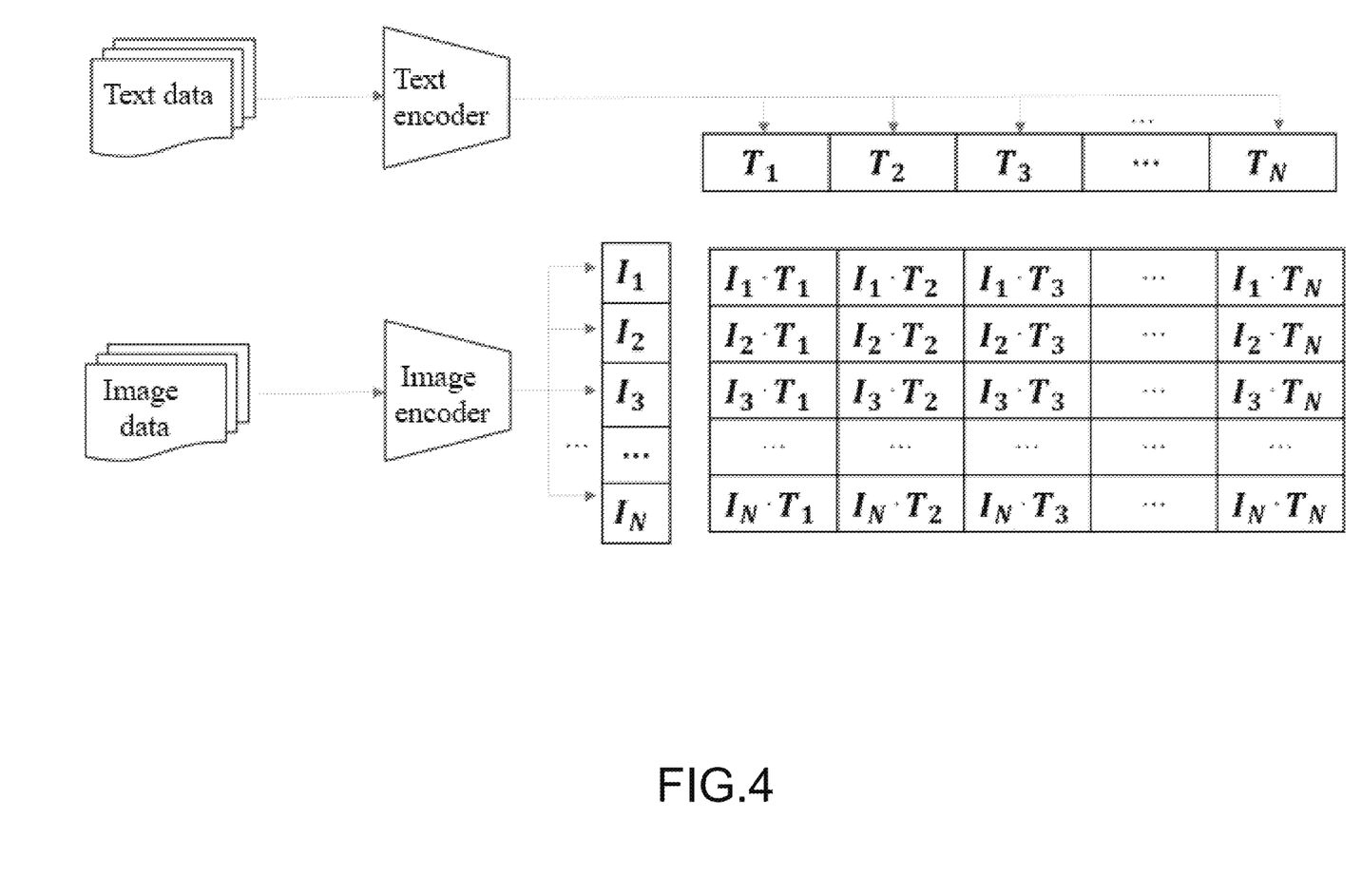
FIG. 4 is a flowchart illustrating the process of the CLIP model in this invention associating image information with text information.

S23: For image-text correspondence information, extract feature using the CLIP model.

The CLIP (Contrastive Language-Image Pre-Training) model is a multimodal model capable of recognizing the contents in images, the language describing the images, and drawing connections between the two. Initially, samples pairing image with matching text description are built. Then, the images and the text descriptions are fed into an image processing module and a text processing module in the CLIP model, respectively. After that, data processed by the image processing module and the text processing module are linearly projected into a multimodal space. Similarities between the two modalities are then calculated, yielding the matching degree between the text information and the image information. Specifically, the linear projection operation involves mapping the data processed by the encoder to a low-dimensional space via matrix multiplication. This low-dimensional space is usually defined by the weight matrix in the network. After the linear projection operation, the image and text information can be represented as embedding vectors, denoted as $E_{img}$ and $E_{text}$, respectively. The similarity Sim is calculated using cosine similarity, with the formula:

$$Sim = \frac{E_{img} \cdot E_{text}}{\|E_{img}\| \cdot \|E_{text}\|}$$

FIG. 4 depicts an overview of a CLIP model for extracting feature from text-image matching information.

For data that supports text and image matching, training data pairs <image, text> may be constructed. The text data may be encoded using the text encoder ALBERT readily trained at step S21, with the $E_{pos}$ vector associated with the text position information being chosen as the feature representation vector $E_{text}$ of the text. In this embodiment, the position encoding is used to furnish the model with position information about individual positions in the input sequence. The position encoding is a fixed matrix having the same dimension as the input embedding. The position encoding vector may be generated based on a position index and a position encoding function, where the position index represents the positions of individual words in the sequence, typically ranging from one to the length of the sequence, and the position function may be typically chosen from sine or cosine functions. Therefore, with the position index and dimension being known, they may be passed into the position function for calculation.

The corresponding image data may be encoded using the image encoder ViT readily trained at step S22, with the class token being chosen as the feature representation vector $E_{image}$ of the image information.

Two sets of corresponding feature representation vectors are projected into the multimodal space through multimodal embedding. The text corresponding parameter and the image corresponding parameter are $W_t$, $W_i$, respectively. After the projection, the two sets of vectors are denoted T, I:

$$T = W_t(E_{text})$$

$$I = W_i(E_{image})$$

After the vector representations as projected in the multimodal space have been obtained, the cosine similarity between the text-image vectors is calculated. The vectors are passed by rows and by columns through the softmax function for learning using a cross-entropy loss function. The calculation by rows aims to determine the most similar text for a given image, while the calculation by columns aims to determine the most similar image for a given text segment. After that, the loss functions of the rows and columns are summed and averaged to simultaneously consider the bidirectional relationship between the texts and images. Through contrastive learning, the loss function is used to narrow the distances between corresponding sample pairs and to expand the distances between non-corresponding sample pairs, thereby learning the relation between the images and texts.

S3: Use different channels to apply asset type recognition to information in different modalities, and use the CLIP model to generate asset void information. Specifically, this step may include:

S31: Separate recognition and classification for information in individual modalities.

Different classification algorithms are used to classify text feature vectors and image feature vectors in order to identify the class and attributes of the assets contained in the feature vectors.

In this embodiment, information in different modalities undergoes asset type recognition in different channels. A sample having only text information will, after text preprocessing, be fed into an ALBERT channel to receive asset class recognition and output an asset class $class_{text}$.

A sample having only image information will, after image preprocessing, be fed into a ViT channel to receive asset class recognition and output an asset class $Class_{image}$.

An asset having corresponding image information and text information will be fed into three channels simultaneously, and the output will be: a text embedding vector representation $E_{present}$ from the ALBERT channel, an image embedding vector representation $E_{image}$ from the ViT channel, and a text-image matching similarity Sim from the CLIP channel.

S32: Generate asset void information using the CLIP model.

For an asset having only image information or text information, the existing image information or text information will be fed into the CLIP model to yield the complementary text information or image information.

In this embodiment, the void information is supplemented by the CLIP model. For scenarios requiring information supplementation (e.g., the asset only has text or image), information generative training will be needed. The training process involves selecting data having text-image pairs. During the training, an information supplementation module of the CLIP model is fed with a text data or an image data of a text-image pair, with the corresponding real image information or text information being used as label information $label_{real}$. The loss function $Loss_{gen}$ for the generation module is denoted as:

$$Loss_{gen} = |label_{real} - label_{output}|$$

During the training, the $Loss_{gen}$ in the generation module can mold the information in the CLIP generation module into closer approximation to the real label information, resulting in more accurate generated information. At the end of the training, the text information or image information may be fed into the CLIP model to obtain the corresponding supplementary information for the needed information filling.

S4: Perform joint recognition based on the text information classification, the image information classification and the text-image matching model to yield an asset recognition result. Specifically, this may include:

consolidating classification information from different channels to determine the final class.

The classification information obtained at step S31 and the matching degree obtained from the CLIP model are consolidated. When class outputs from the different channels are consistent and the matching degree from the CLIP model is above a threshold, yield the class information. When the class outputs from the different channels are inconsistent or the matching degree is not above the threshold, discriminatively fuse the classes based on the matching degree of the various information, and output the final asset class information.

For assets having only texts, the outcome from the text recognition channel is taken as the recognition outcome.

For assets having only images, the outcome from the image recognition channel is taken as the recognition outcome.

For assets having both images and texts, perform a discriminative fusion training, including the steps detailed below.

For a batch of training set, obtain the resultant feature embedding vectors $E_{present}$ and $E_{image}$ from the text channel (the ALBERT model) and the image channel (the ViT model), respectively. Feature embedding vectors having matching text and image are expected to be in close distance in their respective modal spaces. Let $Dis_s$ denote the distance between the feature embedding vectors whose image and text match, and $Dis_n$ denote the distance between the feature embedding vectors whose image and text do not match, then we should have $Dis_s < Dis_n$. The specific formulas are as follows:

$$Dis_s = (E_{present}^i - E_{image}^i)$$

$$Dis_n = (E_{present}^i - E_{image}^j) i \neq j$$

Meanwhile, information represented in different modalities is expected to exhibit similar relation in terms of distances. Specifically, let $e_{p1}$ be a first item in the text space, $e_{p2}$ a second item in the text space, then in the image space, their corresponding embedding vectors should be distanced similarly. In particular, let $e_{i1}$ be the first item in the image space, and $e_{i2}$ the second item in the image space, then their distances can be denoted by the following formulas:

$$Dis(e_{p1}, e_{p2}) = Dis(e_{i1}, e_{i2})$$

$$Dis(e_{p1}, e_{p2}) = e_{p1} - e_{p2}$$

$$Dis(e_{i1}, e_{i2}) = e_{i1} - e_{i2}$$

In addition, the similarity output Sim from the CLIP model is used as an accumulation term, and together with the above formulas, we may construct the $Loss_{critic}$ for training the discriminative fusion. With this Loss function, the final embedding vectors from the three channels can be learned simultaneously to yield the final discriminative class. The training Loss may be reformulated as follows:

$$Loss_{critic} = \min \alpha(-\Sigma \log \sigma(Dis_s - Dis_n)) + \beta(Dis(e_{i1}, e_{ij}) + Dis(e_{p1}, e_{p2})) + \gamma Sim$$

where the $\alpha$, $\beta$, $\gamma$ are automatically learned and generated for different datasets, and $\sigma$ is a sigmoid activation function.

After the training, a discriminatively fused embedding vector representation $E_{final}$ is obtained, which will be passed through a softmax classifier for classification to obtain the final class $Class_{final}$:

$$Class_{final} = softmax(critic(E_{present}, E_{image}, Sim))$$

Embodiment 2

Figure 5:
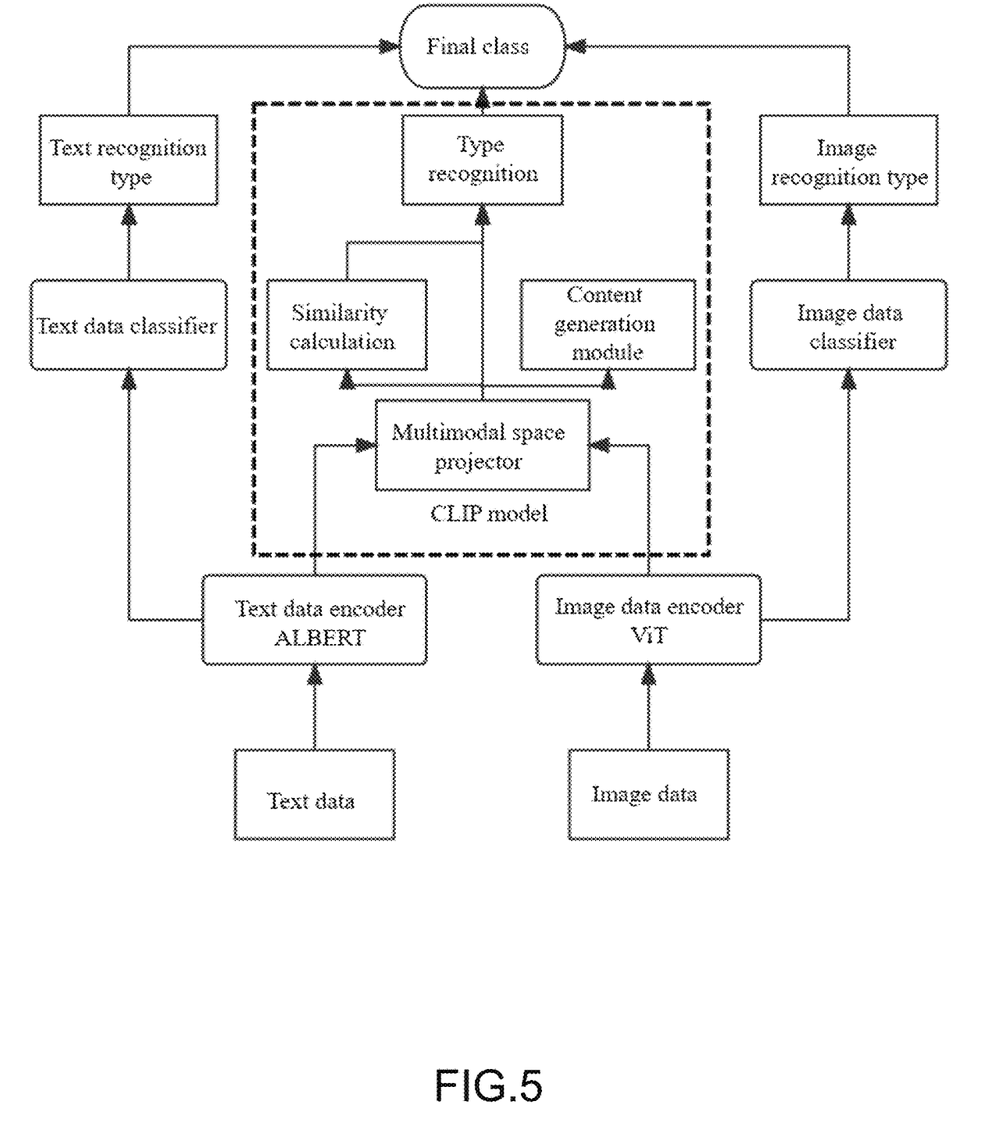
FIG. 5 is a block diagram illustrating a framework of the multimodal data heterogeneous Transformer-based asset recognition system of this invention.

This embodiment provides a multimodal data heterogeneous Transformer-based asset recognition system for implementing the method of the Embodiment 1, the system including: an information collection module, a model building module, a text data encoder, an image data encoder, a text data classifier, an image data classifier, a matching information extraction module, a multimodal space projector, a similarity calculation module, a content generation module, a discriminative fusion module, and an asset class information outputting module.

In this embodiment, the information collection module collects various-modal information of an asset, including text information and image information.

In this embodiment, the model building module builds an ALBERT model, a ViT model, and a CLIP model.

In this embodiment, the text data encoder uses the ALBERT model to extract a text information feature, and uses a multilayer Transformer encoder to learn a context relation in a text sequence.

In this embodiment, the text data classifier connects an output of the ALBERT model to a fully connected layer, and outputs final classification information.

In this embodiment, the image data encoder uses the ViT model to extract an image information feature: divide the image information into tokens; use a Transformer encoder to capture and learn content information from the dividing of the image information.

In this embodiment, the image data classifier uses a classification head to map an image feature to class information.

In this embodiment, the matching information extraction module uses the CLIP model to extract image-text matching information feature: build an image with matching text description sample pair; encode the image information and the text information to obtain an image feature representation vector and a text feature representation vector.

In this embodiment, the multimodal space projector linearly project the image feature representation vector and the text feature representation vector into a multimodal space.

In this embodiment, the similarity calculation module calculates a similarity between two modalities to obtain a matching degree between the image information and the text information.

In this embodiment, the content generation module uses the CLIP model to generate asset void information.

In this embodiment, the discriminative fusion module uses different channels to apply asset type recognition to information in different modalities, output classification information from the different channels, and discriminatively fuse the classification information from the different channels with the matching degree between the image information and the text information obtained by the CLIP model.

In this embodiment, the asset class information outputting module outputs the final asset class information.

Embodiment 3

This example provides a computing device, which may be a desktop computer, a laptop, a smartphone, a PDA (personal digital assistant) handheld terminal, a tablet, or any terminal device having display capabilities. The computing device includes a processor and a memory storing thereon one or more programs that, when being executed by the processor, implements the multimodal data heterogeneous Transformer-based asset recognition method of the Embodiment 1.

The above embodiments are some preferred embodiments of this invention, but the embodiments of this invention are not limited thereto. Any and all changes, modifications, substitutions, combinations, simplifications that do not depart from the spirit and principles of this invention should be considered equivalent alternatives and are deemed within the scope of protection of this invention.

What is claimed is:

1. A multimodal data heterogeneous Transformer-based asset recognition method, comprising:
collecting various-modal information of an asset, comprising text information and image information;
building an A Lite Bidirectional Encoder Representations from Transformers, ALBERT, model, a Vision Transformer, ViT, model, and a Contrastive Language-Image Pre-Training, CLIP, model;
by the ALBERT model, extracting a text information feature: using a multilayer Transformer encoder to learn a context relation in a text sequence; connecting an output of the ALBERT model to a fully connected layer; and outputting final classification information, wherein this step comprises:
preprocessing the text information; converting the preprocessed text information into a vector representation; adding an identifier to indicate a start or an end; performing padding and truncating; randomly replacing part of the texts with [MASK] tokens; and by a Masked Language Modeling, MLM, model, performing inferential prediction;
generating a token embedding vector $E_{token}$, a segment embedding vector $E_{seg}$, and a position embedding vector $E_{pos}$; and representing a generated embedding by:

$$E=E_{token}\|E_{seg}\|E_{pos}$$

wherein the $\|$ denotes concatenation;
randomly initializing a token embedding matrix and selecting a corpus for training, wherein the training comprises updating values in the embedding matrix to fit the corpus; setting a memorized token embedding vector upon termination of the training to be a final embedding vector; learning a paragraph containing a word based on the segment embedding vector; and learning a relative position of a word based on the position embedding vector;
feeding the generated embedding into a multilayer perceptron to obtain a vector $E_{obj}$; feeding the vector $E_{obj}$ into the Transformer encoder to generate a presence vector $E_{present}$, denoted as:

$$E_{present}=\text{Transformer}_{encoder}(E_{obj})$$

wherein the Transformer$_{encoder}$ denotes the Transformer encoder;
passing the presence vector $E_{present}$ through the fully connected layer MLP$_{class}$ and a softmax function for classification to obtain an recognition type as:

$$\text{type}=\text{softmax}(MLP_{class}(E_{present}));$$

by the ViT model, extracting an image information feature: dividing the image information into tokens; using a Transformer encoder to capture and learn content information from the dividing of the image information; and using a classification head to map an image feature to class information;
by the CLIP model, extracting image-text matching information feature: building an image with matching text description sample pair; encoding the image information and the text information to obtain an image feature representation vector and a text feature representation vector; linearly projecting the image feature representation vector and the text feature representation vector into a multimodal space; calculating a similarity between two modalities to obtain a matching degree between the image information and the text information;
by different channels, applying asset type recognition to information in different modalities; outputting classification information from the different channels; by the CLIP model, generating asset void information; and discriminatively fusing the classification information from the different channels with the matching degree between the image information and the text information obtained by the CLIP model, and outputting final asset class information, and this step comprises:

for an asset having both an image and a text, performing a discriminative fusion training, comprising:

obtaining final feature embedding vectors from the text channel and the image channel, respectively, wherein distances between the feature embedding vectors of the matching text and image as in respective modal spaces are denoted as:

$$Dis_s = (E_{present}{}^i - E_{image}{}^i)$$

$$Dis_n = (E_{present}{}^i - E_{image}{}^j) i \neq j$$

wherein the $E_{present}{}^i$ denotes a text feature embedding vector, the $E_{image}{}^i$ denotes an image feature embedding vector, the $Dis_s$ denotes a distance between the feature embedding vectors of image and text having matching information, and the $Dis_n$ denotes a distance between the feature embedding vectors of non-matching image and text;

wherein, in different modalities, distances between embedding vectors representing different information is denoted as:

$$Dis(e_{p1}, e_{p2}) = Dis(e_{i1}, e_{i2})$$

$$Dis(e_{p1}, e_{p2}) = e_{p1} - e_{p2}$$

$$Dis(e_{i1}, e_{i2}) = e_{i1} - e_{i2}$$

using the matching degree output from the CLIP model as an accumulation term to build a loss for the discriminative fusion training, denoted as:

$$Loss_{critic} = \min \alpha(-\Sigma \log \sigma(Dis_s - Dis_n)) + \beta(Dis(e_{i1}, e_{ij}) + Dis(e_{p1}, e_{p2})) + \gamma Sim$$

where α, β, γ are automatically learned and generated for different datasets, σ is a sigmoid activation function, and Sim denotes the matching degree;

after the training, obtaining the discriminatively fused embedding vector representation $E_{final}$, and passing the same through a softmax classifier for classification to obtain the final asset class information, denoted as:

$$Class_{final} = softmax(critic(E_{present}, E_{image}, Sim))$$

wherein the $E_{present}$ denotes the text channel feature embedding vector, the $E_{image}$ denotes the image channel feature embedding vector, and the $Class_{final}$ denotes the final asset class information.

2. The method according to claim 1, wherein the by the ViT model, extracting an image information feature: dividing the image information into tokens; using a Transformer encoder to capture and learn content information from the dividing of the image information; and using a classification head to map an image feature to class information comprises:

dividing an image into multiple image patches, and mapping the image into a D-dimensional vector $E_D$ through the fully connected layer, denoted as:

$$E_D = MLP(\text{image patch})$$

adding a class token and a position token to the vector $E_D$ to form an input $Input_{trans}$ for the Transformer encoder, denoted as:

$$Input_{trans} = E_D + \text{position token} + \text{class token}$$

passing an embedding corresponding to a class token output from the Transformer encoder through the multilayer perceptron and a softmax function to output a probability of a class; and setting the class with the highest probability to be a final determined class $output_{class}$ by the ViT model, denoted as:

$$Output_{class} = MAX(softmax(MLP(Transformer(Input_{trans}))))$$

wherein the MLP denotes the multilayer perceptron.

3. The method according to claim 1, wherein the encoding the image information and the text information to obtain an image feature representation vector and a text feature representation vector; linearly projecting the image feature representation vector and the text feature representation vector into a multimodal space; calculating a similarity between two modalities to obtain a matching degree between the image information and the text information comprises:

encoding the image information and selecting a class token to be a feature representation vector $E_{image}$ of the image information;

encoding the text information and selecting a vector associated with text position information to be a feature representation vector $E_{text}$ of the text;

projecting the embedding of multimodalities into the multimodal space, wherein projected vectors are denoted as:

$$T = W_t(E_{text})$$

$$I = W_i(E_{image})$$

wherein $W_t$ the denotes text corresponding parameters, the $W_i$ denotes image corresponding parameters, T represents a text vector projected in the multimodal space, and I represents an image vector projected in the multimodal space;

calculating a cosine similarity between the text vectors and the image vectors, and passing the vectors by rows and by columns through the softmax function to learn using a cross-entropy loss function.

4. The method according to claim 1, wherein the by different channels, applying asset type recognition to information in different modalities; outputting classification information from the different channels comprises:

for a sample having only text information: after text preprocessing, feeding into an ALBERT channel to perform asset class recognition, and outputting an asset class;

for a sample having only image information: after image preprocessing, feeding into a ViT channel to perform asset class recognition, and outputting an asset class;

for an asset having corresponding image information and text information: feeding into three channels, and outputting: a text embedding vector representation from the ALBERT channel, an image embedding vector representation from the ViT channel, and a text-image matching similarity from the CLIP channel.

5. The method according to claim 1, wherein the by the CLIP model, generating asset void information comprises:

obtaining data having a text-image pair; selecting text data or image data from the text-image pair; setting corresponding real image information or real text information to be label information, wherein a loss function $Loss_{gen}$ for a generation module of the CLIP model is denoted as:

$$Loss_{gen} = |label_{real} - label_{output}|$$

wherein the label$_{real}$ denotes the label information, and the label$_{output}$ denotes output information;

after completion of the training, feeding the text information or the image information into the CLIP model to obtain corresponding complementary information.

6. The method according to claim 1, wherein the discriminatively fusing the classification information from the different channels with the matching degree between the image information and the text information obtained by the CLIP model comprises:

jointly identifying the classification information from the different channels with the matching degree obtained from the CLIP model; when class outputs from the different channels are consistent and the matching degree from the CLIP model is above a threshold, outputting the class information; when the class outputs from the different channels are inconsistent or the matching degree is not above the threshold, discriminatively fusing the classes based on the matching degree, and outputting the final asset class information.

7. A computing device, comprising a processor, and a memory for storing a program executable by the processor, wherein the processor implements, upon execution of the program stored in the memory, the multimodal data heterogeneous Transformer-based asset recognition according to claim 1.

8. A multimodal data heterogeneous Transformer-based asset recognition system, comprising: an information collection module, a model building module, a text data encoder, an image data encoder, a text data classifier, an image data classifier, a matching information extraction module, a multimodal space projector, a similarity calculation module, a content generation module, a discriminative fusion module, and an asset class information outputting module, wherein:

the information collection module collects various-modal information of an asset, comprising text information and image information;

the model building module builds an A Lite Bidirectional Encoder Representations from Transformers, ALBERT, model, a Vision Transformer, ViT, model, and a Contrastive Language-Image Pre-Training, CLIP, model;

the text data encoder uses the ALBERT model to extract a text information feature, and uses a multilayer Transformer encoder to learn a context relation in a text sequence, and it comprises:

preprocessing the text information; converting the preprocessed text information into a vector representation; adding an identifier to indicate a start or an end; performing padding and truncating; randomly replacing part of the texts with [MASK] tokens; and by a Masked Language Modeling, MLM, model, performing inferential prediction;

generating a token embedding vector $E_{token}$, a segment embedding vector $E_{seg}$, and a position embedding vector $E_{pos}$; and representing a generated embedding by:

$$E=E_{token}\|E_{seg}\|E_{pos}$$

wherein the $\|$ denotes concatenation;

randomly initializing a token embedding matrix and selecting a corpus for training, wherein the training comprises updating values in the embedding matrix to fit the corpus; setting a memorized token embedding vector upon termination of the training to be a final embedding vector; learning a paragraph containing a word based on the segment embedding vector; and learning a relative position of a word based on the position embedding vector;

feeding the generated embedding into a multilayer perceptron to obtain a vector $E_{obj}$; feeding the vector $E_{obj}$ into the Transformer encoder to generate a presence vector $E_{present}$, denoted as:

$$E_{present}=\text{Transformer}_{encoder}(E_{obj})$$

wherein the Transformer, denotes the Transformer encoder;

the text data classifier connects an output of the ALBERT model to a fully connected layer, and outputs final classification information, and it comprises:

passing the presence vector $E_{present}$ through the fully connected layer $MLP_{class}$ and a softmax function for classification to obtain an recognition type as:

$$\text{type}=\text{softmax}(MLP_{class}(E_{present}));$$

the image data encoder uses the ViT model to extract an image information feature: divide the image information into tokens; use a Transformer encoder to capture and learn content information from the dividing of the image information;

the image data classifier uses a classification head to map an image feature to class information;

the matching information extraction module uses the CLIP model to extract image-text matching information feature: build an image with matching text description sample pair; encode the image information and the text information to obtain an image feature representation vector and a text feature representation vector;

the multimodal space projector linearly project the image feature representation vector and the text feature representation vector into a multimodal space;

the similarity calculation module calculates a similarity between two modalities to obtain a matching degree between the image information and the text information;

the content generation module uses the CLIP model to generate asset void information;

the discriminative fusion module uses different channels to apply asset type recognition to information in different modalities, output classification information from the different channels, and discriminatively fuse the classification information from the different channels with the matching degree between the image information and the text information obtained by the CLIP model, and it comprises:

for an asset having both an image and a text, performing a discriminative fusion training, comprising:

obtaining final feature embedding vectors from the text channel and the image channel, respectively, wherein distances between the feature embedding vectors of the matching text and image as in respective modal spaces are denoted as:

$$\text{Dis}_s=(E_{present}{}^i-E_{image}{}^i)$$

$$\text{Dis}_n=(E_{present}{}^i-E_{image}{}^j)i\neq j$$

wherein the $E_{present}{}^i$ denotes a text feature embedding vector, the $E_{image}{}^i$ denotes an image feature embedding vector, the $\text{Dis}_s$ denotes a distance between the feature embedding vectors of image and text having matching information, and the $\text{Dis}_n$ denotes a distance between the feature embedding vectors of non-matching image and text;

wherein, in different modalities, distances between embedding vectors representing different information is denoted as:

$$Dis(e_{p1}, e_{p2}) = Dis(e_{i1}, e_{i2})$$

$$Dis(e_{p1}, e_{p2}) = e_{p1} - e_{p2}$$

$$Dis(e_{i1}, e_{i2}) = e_{i1} - e_{i2}$$

using the matching degree output from the CLIP model as an accumulation term to build a loss for the discriminative fusion training, denoted as:

$$Loss_{critic} = \min \alpha(-\Sigma \log \sigma(Dis_s - Dis_n)) + \beta(Dis(e_{ii}, e_{ij}) + Dis(e_{p1}, e_{p2})) + \gamma Sim$$

where $\alpha$, $\beta$, $\gamma$ are automatically learned and generated for different datasets, $\sigma$ is a sigmoid activation function, and Sim denotes the matching degree;

after the training, obtaining the discriminatively fused embedding vector representation $E_{final}$, and passing the same through a softmax classifier for classification to obtain the final asset class information, denoted as:

$$Class_{final} = softmax(critic(E_{present}, E_{image}, Sim))$$

wherein the $E_{present}$ denotes the text channel feature embedding vector, the $E_{image}$ denotes the image channel feature embedding vector, and the $Class_{final}$ denotes the final asset class information; and the asset class information outputting module outputs the final asset class information.

\* \* \* \* \*